United States Patent [19]
Wörn et al.

[11] Patent Number: 5,224,032
[45] Date of Patent: Jun. 29, 1993

[54] PROCESS FOR CONTROLLING THE MOVEMENTS OF AN AXIS ON PROGRAM-CONTROLLED MACHINES AND CONTROL SYSTEM

[75] Inventors: Heinz Wörn, Derching; Dietmar Schmid, Essingen, both of Fed. Rep. of Germany

[73] Assignee: Kuka Schwessanlagen + Roboter GmbH, Augsburg, Fed. Rep. of Germany

[21] Appl. No.: 549,407

[22] Filed: Jul. 6, 1990

[30] Foreign Application Priority Data

Jul. 8, 1989 [DE] Fed. Rep. of Germany ....... 3922524

[51] Int. Cl.⁵ .............................................. G05B 19/18
[52] U.S. Cl. .................................. 364/167.01; 395/96
[58] Field of Search ........................... 364/167.01, 165; 395/88, 94, 95, 96, 90, 91; 318/616, 632

[56] References Cited

U.S. PATENT DOCUMENTS

| | | | |
|---|---|---|---|
| 4,587,469 | 5/1986 | Ikabe et al. | 318/632 |
| 4,788,482 | 11/1988 | Tachibann et al. | 318/616 |
| 4,897,586 | 1/1990 | Nakata et al. | 395/95 |
| 4,906,907 | 3/1990 | Tsuchihashi et al. | 395/88 |
| 4,925,312 | 5/1990 | Onaga et al. | 364/165 |
| 4,980,626 | 12/1990 | Hess et al. | 395/94 |

FOREIGN PATENT DOCUMENTS

| | | |
|---|---|---|
| 0062076 | 10/1982 | European Pat. Off. |
| 3151831 | 7/1982 | Fed. Rep. of Germany |
| 3302063 | 1/1983 | Fed. Rep. of Germany |

*Primary Examiner*—Joseph Ruggiero
*Assistant Examiner*—Jim Trammell
*Attorney, Agent, or Firm*—McGlew & Tuttle

[57] ABSTRACT

The present invention pertains to a process and a system for controlling the movements of an axis on program-controlled machines, especially industrial robots, comprising a position control unit and/or a velocity control unit and/or a power control unit. The loads acting on the axis from the outside during the operation are measured by one or several sensors. The load signal is fed back regeneratively in the sense of an increase in the position control variance and sent to the summation point of the position and/or velocity control unit. To increase or decrease the mechanical flexibility of the axis, a controllable amplifying or attenuating device is provided. The sensors may have different designs, corresponding to the loads to be measured. They are preferably directly associated with the axes.

15 Claims, 3 Drawing Sheets

PROCESS FOR CONTROLLING THE MOVEMENTS OF AN AXIS ON PROGRAM-CONTROLLED MACHINES AND CONTROL SYSTEM

FIELD OF THE INVENTION

The present invention pertains in general to a process for controlling the movements of an axis on program-controlled machines, and in particular to a control system incorporating mechanical flexibility into the movements of the axis.

BACKGROUND OF THE INVENTION

Conventional structures of control units for movable axes on program-controlled machines, especially in the case of industrial robots, are intended to move along a programmed path as accurately as possible, regardless of the load. The control units currently available are unable to respond in the desired manner to deviations or obstacles occurring in reality by yielding. To circumvent the problems, mechanical flexibilities and/or expensive, monitoring devices must be installed in the robots. This requires extra efforts in terms of design and programming, as well as extra costs.

SUMMARY AND OBJECTS OF THE INVENTION

Therefore, the task of the present invention is to provide a possibility for controlling the movements of an axis on program-controlled machines, which permits avoidance and mechanical flexibility at obstacles or in the case of other loads acting on the axis from the outside in a simple, inexpensive, and reliable manner.

This task is accomplished by the present invention by incorporating a load sensor which generates a load feedback signal indicating the load applied to the axis. This load signal is combined with other control signals in a positive manner, compared to the other control signals which are normally fed back in a negative manner. This positive feeding back of load signals allows the control system for the axis to compensate for loads and to give the control system some mechanical flexibility when controlling the actions of the axis. It provides for a load-adaptive control which is superimposed onto the existing "rigid" control structure when necessary. External loads on the axis during operation are detected by sensors, and the return signal of these sensors is fed into the existing control unit of the axis in the form of a regenerative feedback.

Due to the regenerative feedback, a travel path or a velocity is added on the position and/or velocity control unit, according to the load. A position control variance that is proportional to the load is thus generated. This leads to the axis yielding elastically, corresponding to the load. As a result, the movement of the axis comes to a stop if necessary, and it can also be reversed to the opposite direction in extreme cases. If a plurality of controlled axes are present, the other axes are able to continue to move without prejudice, depending on the nature of the load or the obstacle, so that the movement of the machine will deviate from the programmed path. As soon as the load i s eliminated, the axis automatically returns to the programmed path due to the elimination of the load signal.

Compensation is thus achieved in the control system in the case of collision and loading, and the program control or the continuous-path control itself does not need be changed. The expense of programming is therefore substantially lower than it would be according to the present state of the art.

The control method and control system according to the present invention can be used for various axis kinematics, especially translatory and rotary axes. The machines may have one or several axes with this control. Load-adaptive control offers advantages especially for program-controlled machines, because it automatically compensates for loads and obstacles. Program-controlled machines also include sensor-guided systems as well as other machines that automatically follow a path. However, load-adaptive control is also useful in conjunction with manually controlled machines for collision protection and overload protection.

A preferred field of application of the load-adaptive control is production and assembly machines, especially systems with multiaxis industrial robots. The present invention can be applied whenever processing and assembly tasks permit supporting of the workpiece. This is especially true in machining processes, such as grinding, polishing, deburring, cleaning of castings, etc.

One particular advantage of the present invention is, in connection with program-controlled machines, the fact that the path to be followed no longer has to be programmed fully accurately. Path errors are automatically compensated for by the load-dependent avoidance. In operations involving removal of material, this permits automatic follow-up of the tool corresponding to the amount of material removed. Tool wear can also be automatically compensated without additional sensors.

The mechanical flexibility of the controlled axis, which can also be called the spring constant, can be influenced by attenuating or amplifying the load signal returned from the sensors. The degree as well as the direction of the desired flexibility can be set with a control program. It is also possible to compensate for static forces, such as gravitation or friction, with stored offset values. Thus, the load-adaptive control responds only to dynamic loads.

The load-adaptive control can be switched on and off by hand or in a program-controlled manner. It is switched on only when needed, e.g., during processing operations, but is out of operation during feed and return movements. This is the case, e.g., during robot-guided spot welding, where the programmed welding position is approached with "hard" control units, i.e., with the load-adaptive control unit switched off. The control units are switched to flexible operation only after closure of the welding tongs. This permits, for example, orthogonal alignment of the welding tongs relative to the sheet metal and thus a better welding result as well as ultimately relief for the robot.

Another application is the use of load-adaptive control for the fine programming of the path to be controlled. The path points are approximately preprogrammed without the load-adaptive control, after which these points are traveled along and the actual path points are continuously entered into the memory of the control unit during this travel. The accurate shape of the path is thus determined.

In addition, the load-adaptive control can be switched on and off periodically. It is thus possible to influence the intensity of the regenerative feedback and consequently the flexibility. On the other hand, position control variances due to friction in the mechanical transmission elements can be practically avoided by providing a plurality of movement axis, so that the elastic yielding behavior is preserved.

Various possibilities are available for arranging and designing the load-measuring sensors. The sensors can determine the load directly as a force or torque. However, the load can also be determined indirectly from the motor power. Depending on the type and number of the movement axes, this can be achieved with sensors which are directly associated with each axis and detect the axis-specific loads on the spot. However, it is also possible to use a multidimensionally measuring sensor, which is located, e.g., immediately behind the tool on the movement axis directly connected thereto and acts on the difference axes of the machine after appropriate processing of the signals.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
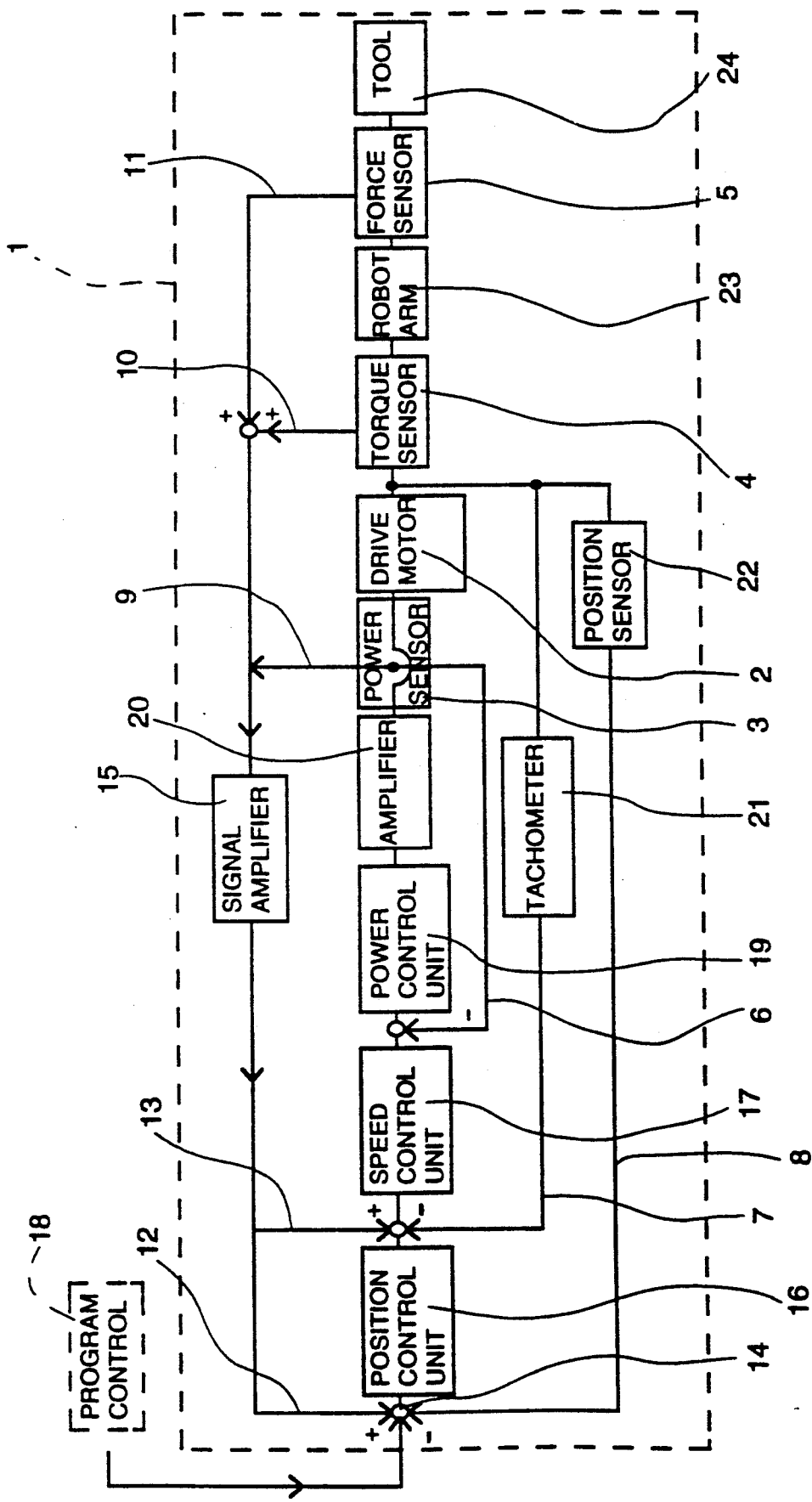
FIG. 1 is the functional circuit diagram of the control circuit on an axis.
Figure 2:
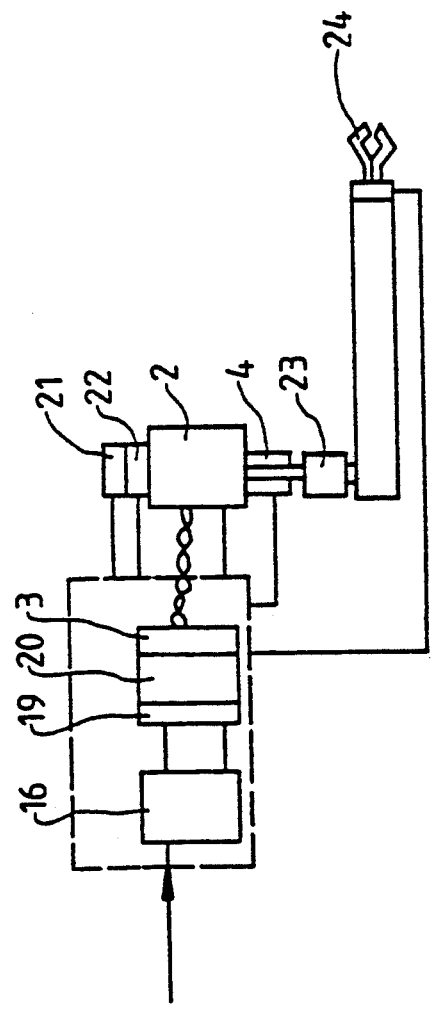
FIG. 2 is an arrangement corresponding to FIG. 1.

The drawings shows a movable and driven axis 1 which is represented here as a rotary axis for the rotary movement of a tool 24 on a robot arm 23. In the exemplified embodiment shown, the movements of the axis are controlled in terms of position, velocity or rotation speed, and drive torque.

A position sensor 22, represented schematically, which is designed as an absolute value transducer connected to the axis, is provided for position control 8. Its signal is fed, with a negative sign, to the summation point of the position control unit 16 and is compared with desired position values fed into the control system from the outside. In the exemplified embodiment shown, the position control unit 16 is the first control unit of the system. The desired position values are fed in section by section from a program control or path director 18 not shown in greater detail.

A tachometer generator 21 is provided on the axis 1 for the velocity control 7, which is designed as a rotation speed control unit for the rotary axis shown. Its signal is fed to the summation point of the velocity control unit or rotation speed control unit 17. The rotation speed control unit 17 follows the position control unit 16.

A power control signal 6 is provided for setting the torque and maintaining it at a constant value. The drive motor 2 is designed as a variable d.c. motor in the known manner. The power consumed by the drive motor is measured by a power sensor 3, whose signal is sent to a power control unit 19 with an amplifier 20 following it. The power control unit 19 and the amplifier 20 in turn follow the rotation speed control unit 17.

To achieve a rigid machine design, especially a rigid robot design and powerful, quickly responding drive, the above-mentioned control units 6, 7, 8 are designed as a "rigid" control structure. The control units 16, 17, 19 are designed such that they guide the axis 1 on its preprogrammed path even when great load variations occur from the outside due to processing and assembly operations. Therefore, these control units respond basically in a load-independent manner.

To yield to the loads acting on the axis 1 from the outside, a load-adaptive control is superimposed. In the exemplified embodiment shown, this consists of the power sensor 3 on the drive motor 2 and/or a force sensor 5 arranged on the axis 1 in the vicinity of the tool 24 and/or a torque sensor 4 arranged in the vicinity of the drive motor 2. All the sensors are shown in FIG. 1, and their return lines 9, 10, 11 are connected to a common summation point. A single sensor 3, 4, or 5 or a chosen combination of the sensors may be used in practice. This results in many control signation combinations varying in size and form.

The sensors 4, 5 shown, directly measure the external loads occurring during operation. Such loads may represent a collision of the tool 24 with an obstacle. However, they may also be represented by a overload of the tool during its intended functioning, e.g., an excessive depth of penetration or contact pressure in the case of a milling cutter, a grinding wheel, or another material-removing tool. Loads acting on the axis 1 may also occur during assembly operations due to the action of forces from the outside or incorrect positioning.

The power sensor 3 measures the load by measuring the motor power. An external load is manifested in a change in the drive torque, and a corresponding increase in power. In multiaxis machines, especially industrial robots, the load acting, e.g., on the robot hand is distributed among a plurality of axes. Measurement by measuring the motor power has the advantage that the load is determined in an axis-specific manner. In addition, the loads may have any degree of complexity and occur in a plurality of areas. The elasticities present in the mechanical transmission elements 23 are also taken into account automatically in the case of motor power measurement.

The returned load signal, or signals, are influenced in an amplifying or attenuating device 15. This is a signal amplifier or signal attenuator, which is controlled and can be adjusted from the outside. It may be energized, e.g., by the program control unit 18 of the machine.

In the exemplified embodiment shown, the processed load signal is sent to the summation point of the position control unit 1 via the connection line 12 and/or to the torque control unit 17 via connection line 13. The signal is fed in with a positive sign in terms of a regenerative feedback. The signals from the tachometer generator 21 and the position sensor 22 are fed in with negative sign in the usual manner. The position control variance 14 is increased by the regenerative feedback when a load occurs. A travel path 12 or a rotation speed 13 is added by the regenerative feedback as long as the load is compensated.

The regenerative feedback is manifested as a load-dependent flexibility of the axis 1. When an obstacle or any other external load appears, the movement of the axis is therefore decelerated despite the difference between the desired values and the actual values of the position and/or rotation speed values and may also stop in the case of a nonyielding obstacle. Depending on the drive and control structures, the drive 2 can even be reversed and the axis 1 is able to move in the reverse direction. This happens when a force whose direction is opposite the direction of the normal movement of the axis acts on the axis 1 or the tool 24. This may happen, e.g., during the collision of the tool 24 with a moving object. The axis 1 yields and deviates in the rearward direction.

The path director 18 performs, in this connection, a limit value monitoring, which permits the axis to yield only within defined, predetermined limits. Overshooting of the path director 18 is thus ruled out by the load-adaptive control.

Once the obstacle or load has been eliminated, the load signal disappears and the control system again shows its normal "hard" behavior. The axis 1 is now adjusted to the desired values of position, velocity, drive torque, etc., such that these values will be maintained and variances will be kept at a minimum.

Consequently, the control system contains a combination of control circuits with different feedbacks. One or more of the load-adaptive master control circuit 3, 4, 5, 9, 10, 11, 12, 13 may be fed back regeneratively, whereas one or more of the subordinate control circuits 6, 7, 8 may be fed back negatively.

The influence of the load signal on the control unit can be changed by amplifying or attenuating the load signal in the signal amplifier 15. If the load signal is amplified compared with the position and rotation speed signals, the flexibility of the axis will increase. Conversely, attenuation of the load signal leads to greater rigidity.

Offset values, which represent the static load inherently occurring during the operation, such as gravitation, friction, etc., are stored in the signal amplifier 15 or in the program control unit 18 connected thereto. When the signals returned from the sensors 3, 4, 5 exceed or fall below the offset value, the difference from the offset value is sent to the summation points of the control units 16, 17. Thus, the axis 1 responds to changes relative to the static load.

Offset values can also be used to switch on the load-adaptive control only under dynamic loads at a minimum level which can no longer be compensated by the intrinsic elasticity of the machine.

The superimposed load-adaptive control can be switched on and off deliberately via the signal amplifier 15. This can be done manually or in a program-controlled manner. In addition, switching on and off periodically is also possible.

Load-adaptive control has various fields of application, which can also be combined:

The first field is overload and collision monitoring in the sense of a pure safety device. The course of the path and the movements of the axis can be accurately preset. Loads acting on the axis from the outside are absent, e.g., in the case of a contactless feed motion or a guiding movement during oxyacetylene welding along a path, etc Only the occurrence of unusual obstacles or loads is monitored in this case. If a plurality of axes controlled in a load-adaptive manner are present, the machine, e.g., a multiaxis industrial robot, can bypass or pass over obstacles in a nonpositive manner.

The second field is the use of load-adaptive control for following the programmed path. Loads acting on the axis from the outside are inherently present, e.g., during assembly operations or machining, where the tool is supported by the workpiece.

Figure 3:
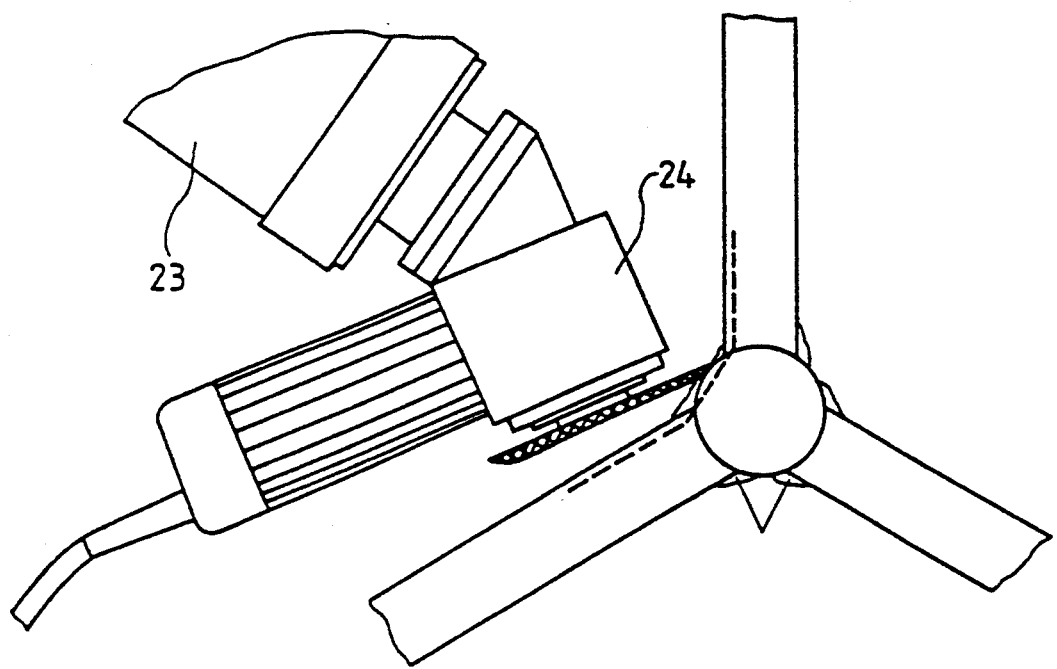
FIG. 3 is a case of application with a robot-guided grinding tool.

FIG. 3 shows this on the basis of a grinding tool 24 guided on the robot arm 23. The course of the path is programmed only approximately and is even placed into the workpiece here, and the fine coordination of the different robot axes is performed by their load-adaptive control units. Path errors caused by the approximate programming are compensated for by the load-adaptive control unit such that the load acting on the respective axis or tool remains constant. The grinding tool 24 is thus always guided with constant cutting force. The movements of the axis depend on the desired force, as a result of which the amount of material removed by grinding and the wear on the tool are compensated for automatically. The movements of the axis and the operation are globally controlled via a limit value monitoring device in the program control device 18 of the industrial robot and are terminated in time.

The third field is the fine programming of the course of a path by means of load-adaptive control. The axis or axes travels along a path preprogrammed approximately and deliberately for a collision course. The collisions induce load acting on the axis. At these points, the affected axes performs an avoiding movement corresponding to the shape of the object of the collision. The machine is stopped at these points and the axes affected are moved back so that no further load will be measured. The spatial position value thus obtained from the positions of the different axes is entered into the program control unit as a point on the path.

Deviations from the exemplified embodiment shown are possible in several respects. Reference numeral 23 generally designates a mechanical transmission member. In the exemplified embodiment shown, this may consist of a gear train by means of which the motor speed is reduced for the tool 24. For the field of application of a multiaxis industrial robot, the axis 1, whose functional representation is shown in FIG. 1, can also be considered to be a vertical carousel axis. The mechanical transmission member 23 now represents the other assembly units of the robot located between the tool 24 and the robot carousel such as an oscillating crank, angle lever, etc. In this case, the force sensor 5 is located, as before, in the vicinity of the tool 24 and detects the loads occurring there. The sensor measures multidimensionally in this case and is coupled with an evaluating circuit which subdivides the load components acting on the different axes and feeds them into the associated load-adaptive control unit. In this case, the torque sensor 4 is located on the carousel axis, preferably in the vicinity of the drive. The power sensor 3 is located on the carousel drive and automatically measures only the load acting on this axis.

Deviations from the exemplified embodiment shown are also possible in terms of the number and the arrangement of the control circuit. The combination shown may also be replaced with one position control unit or only one rotation speed control unit. It is also possible to dispense with the power control unit. Correspondingly, it is also possible to send the load signals to only one summation point. The hardware type control units shown may also be replaced with software in the program control unit 18 in the form of mathematical models in a computer program or in a computer.

While a specific embodiment of the invention has been shown and described in detail to illustrate the application of the principles of the invention, it will be understood that the invention may be embodied otherwise without departing from such principles.

What is claimed is:

1. A process for controlling an axis on a programmed-control machine, the process comprising the steps of:
    issuing one of a desired position signal indicating where the axis to be positioned, a desired speed signal indicating the desired speed of the axis, and a desired current signal indicating a desired current to be applied to the axis;
    receiving one of a position feedback signal indicating where the axis is presently positioned, a speed feedback signal indicating the present speed of the axis and a current feedback signal indicating the amount of current applied to the axis, said feedback signal corresponding respectively to said one of said issued signal;
    combining one of said received feedback signal in a negative manner with said corresponding respective desired signal to generate an error signal for driving an axis;
    receiving a load feedback signal indicating a load acting on the axis;
    combining said load feedback signal in a positive manner with said error signal, said load signal being combined with said error signal to retard said driving of the axis in proportion to said load feedback signal.

2. A process in accordance with claim 1, further comprising:
    varying an amplitude of said load feedback signal in order to change mechanical flexibility of the axis.

3. A process in accordance with claim 2, wherein:
    said combining of said load feedback signal can be switched on an off in one of a manual and preprogram-control manner.

4. A process in accordance with claim 3, wherein:
    said switching on and off is periodical.

5. A process in accordance with claim 1, further comprising:
    compensating for static forces of said load feedback signal by using stored offset values during said combining.

6. A control system for a moveable axis on a program-controlled machine, the system comprising:
    one of a position control means for adjusting a position of the axis, a speed control means for adjusting a speed of the axis and a current control means for adjusting a current delivered to the axis;
    load sensor means for sensing a load applied to the axis and for generating a load feedback signal proportional to said applied load; and
    summation means for positively feeding back said load feedback signal into said one of said control means to act on the axis in a manner selected from the group of retarding and overextending movement of the axis in proportion to said load feedback signal.

7. A control system in accordance with claim 6, wherein:
    said load sensor means is designed to sense torque applied to the axis.

8. A control system in accordance with claim 6, wherein:
    said load sensor means is arranged on an arm.

9. A control system in accordance with claim 6, further comprising:
    an amplifier means for changing magnitude of said load feedback signal and positioned after said load sensor means and before said one of said control means.

10. A system in accordance with claim 6, wherein:
    the control system controls a plurality of axis with each axis having its own control means; and
    said load sensor means generating a plurality of load feedback signals proportional to loads on each of said plurality of axis.

11. A system in accordance with claim 6, further comprising:
    program control means for performing functions of said control means in software.

12. A process for incorporating mechanical flexibility into a control system of an axis of a programmed controlled machine, the process comprising the steps of:
    issuing a command signal indicating a desired action of the axis;
    receiving an action feedback signal indicating a degree to which said desired action has been completed;
    combining said action feedback signal with said command signal in a negative manner in order to produce an action error signal indicating a remainder of said desired action not yet performed;
    applying said action error signal to said axis to perform said remainder of said desired action;
    receiving a load feedback signal indicating a magnitude of a load applied to the axis; and
    combining said load feedback signal in a positive manner into said action error signal before said action error signal is applied to the axis, said load feedback signal combined with said action error signal to reduce said remainder of said desired action in proportion to said load feedback signal and give the axis mechanical flexibility in responding to applied loads.

13. A process in accordance with claim 12, wherein:
    said desired action is one of controlling position of the axis, controlling velocity of the axis and controlling current supplied to the axis.

14. A process in accordance with claim 12, wherein:
    said above steps are performed continuously during operation of the programmed-controlled machine.

15. A process in accordance with claim 12, wherein:
    said loads are externally applied to the axis and in a direction opposite to said desired action.

* * * * *